March 17, 1925.
W. S. GREEN
1,529,834
APPARATUS FOR LINING BEARINGS
Filed July 21, 1922    2 Sheets-Sheet 1
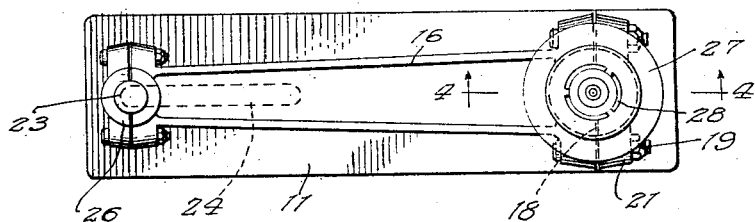
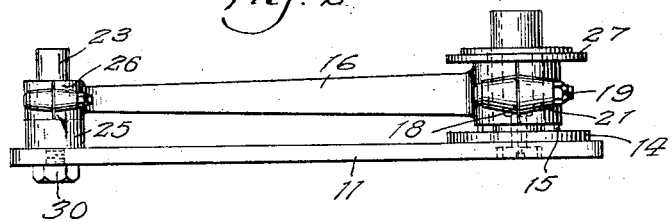
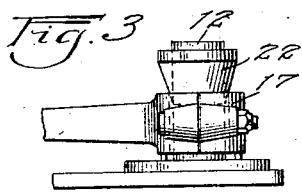 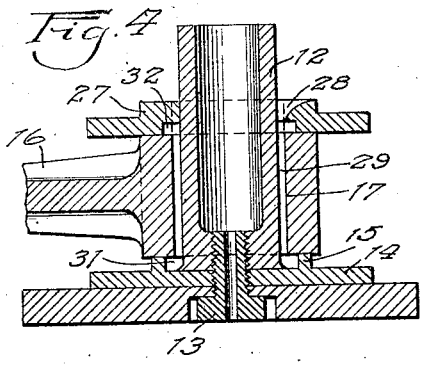

March 17, 1925.
W. S. GREEN
1,529,834
APPARATUS FOR LINING BEARINGS
Filed July 21, 1922    2 Sheets-Sheet 2
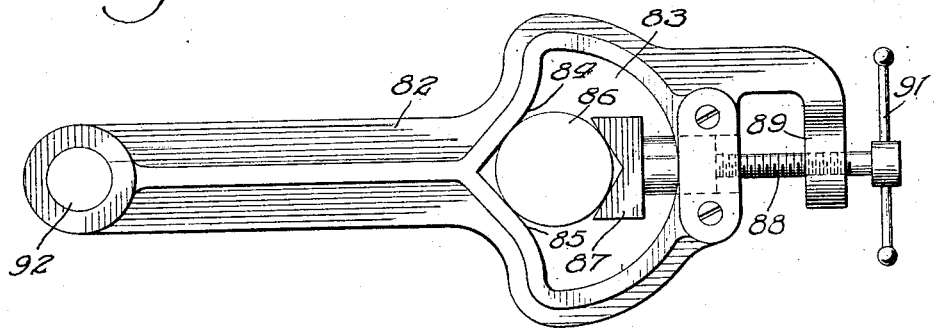
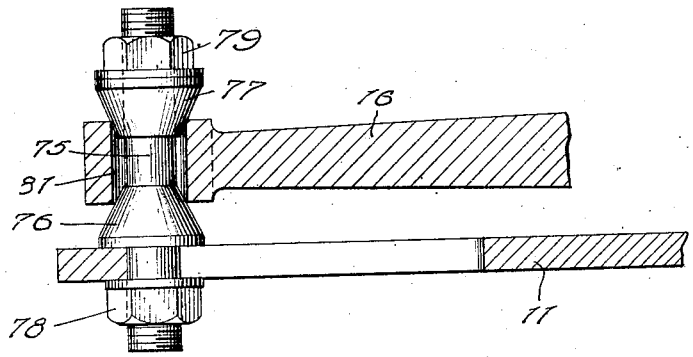
Inventor:
William Stanley Green
By Munday, Clarke & Carpenter
Attys Patented Mar. 17, 1925.

1,529,834

UNITED STATES PATENT OFFICE.

WILLIAM STANLEY GREEN, OF HOOPESTON, ILLINOIS.

APPARATUS FOR LINING BEARINGS.

Application filed July 21, 1922. Serial No. 576,461.

*To all whom it may concern:*

Be it known that I, WILLIAM STANLEY GREEN, a citizen of the United States, residing in Hoopeston, in the county of Vermilion and State of Illinois, have invented a new and useful Improvement in Apparatus for Lining Bearings, of which the following is a specification.

My invention relates in general to apparatus for lining automobile bearings and the like with a suitable material, such as babbitt, and has more particular reference to apparatus of this character which is adapted for use in an ordinary repair shop, thus eliminating the necessity of returning the worn bearing to the factory or a large plant for relining.

In the power mechanism of an automobile, it is necessary that a bearing have a very exact fit around its shaft so that there is no appreciable play, and still the shaft is left free to turn without undue resistance from the bearing surface. The bearings upon which my apparatus is designed to operate may be any of the several employed in the power mechanism, or those provided in the end of the connecting rod which connects the engine piston with the crank shaft which is given rotary movement by the reciprocation of the piston. Repair of these connecting rod bearings has involved particular inconvenience because of the necessity for the return to the plant of the complete rod, the occasion for the exchange of this part often arising at times and places when it may be inconvenient to obtain a new one. It has heretofore been considered impracticable, with the tools and machinery available, for a garage, or small shop, to attempt the rebabbitting either of connecting rod bearings or of main bearings, and it is a principal object of my invention to provide suitable apparatus which will enable the performance of the rebabbitting operation at an ordinary shop or repair station.

It is also an object of my invention to provide, in apparatus of this character, means for accurately centering the bearing in desired relationship to a cooperating part, so that the lining will be of even and uniform thickness, to the end that the bearing surface may be exact throughout.

A further object of the invention is the provision of a suitable babbitting jig for the foregoing purpose, adapted to be used in conjunction with devices for boring and facing the lined bearing, in order to provide a finished and exact bearing surface said devices being claimed in a divisional application bearing Serial No. 673,456.

A still further object of the invention is the provision of means for holding the connecting rod in the exact position desired after the bearing is centered, the mechanism for this purpose being preferably adapted to engage in the wrist pin aperture, which is provided in one end of the rod, regardless of variations in the size of said aperture.

It is also an object of the invention to provide means for mounting a main bearing or the like so that it may be operated upon in an apparatus of this character.

Other objects and advantages of the invention will be apparent as it is better understood from the following description, which, taken in connection with the accompanying drawings, discloses a preferred embodiment thereof.

Referring to the drawings,

Figure 1 is a plan view of the babbitting jig forming a part of the apparatus embodying my invention;

Fig. 2 is a side elevation thereof;

Fig. 3 is a partial side elevation of the same mechanism showing the means for centering a bearing about the core member used in the relining operation;

Fig. 4 is an enlarged sectional view taken substantially on the line 4—4 in Fig. 1;

Fig. 5 is an enlarged sectional view of the means for holding the connecting rod or other part in exact position, irrespective of the size of the aperture through which the clamping bolt extends;

Fig. 6 is a top plan view of a holding bracket by means of which ordinary bearings may be mounted in operative position in the apparatus embodying my invention.

As heretofore stated, it is one of the purposes of my invention to provide a suitable means for mounting and holding the part containing the bearing to be lined which may be installed in an ordinary repair shop without involving too great expense. I employ, for this purpose, a babbitting jig, comprising a supporting base 11, to which is secured a core member 12, the latter, in the present instance, being of hollow formation and being held in place by means of a screw 13 which extends from the bottom through the base 11, and a bearing support 14, which is provided with an annular ridge 15, which is slightly spaced from the base of the core member 12. The connecting rod 16 has, in one end, a bearing 17, which, as ordinarily made, is split transversely at 18, the opposite parts being held together by means of bolts 19, which extend through side projections 21. It will be understood that shims may be employed between the halves of the bearing and removed when necessary to take up wear. It frequently, however, becomes necessary to reline the bearing and the necessity for this arises suddenly, in many instances, and at places where it is impossible to obtain a new connecting rod. In accordance with my invention, the rods may be quickly repaired and restored to use in such event, it being unnecessary to await receipt of a new rod, or for dealers to carry in stock a large number of different size parts which would be required for replacement in a variety of cars.

For the purpose of pouring the babbitt with which bearings of this character are ordinarily lined, the connecting rod may be positioned upon the jig with the bearing 17 surrounding the core member 12, upon which it is centered by means of a sliding cone 22, so that the various parts of the bearing surface are equi-distant from the exterior of said core member 12. When this position has been assumed, the opposite end of the rod may be clamped in position by means of a suitable pin 23 extending through a slot 24 in the base 11. A collar 25, surrounding the pin 23, serves to support the rod at desired height when a clamping bolt 30 is tightened, and it will be understood that said pin extends through a bearing 26 provided in the opposite end of the connecting rod and adapted for the reception of a wrist pin when in its operative position in the car. This clamping device is, of course, adjustable in the slot 24 and, after the rod is clamped in desired position thereby, the cone 22 may be removed and a cap 27 positioned upon the upper end of the core member, this cap being provided with a pouring opening 28 through which the babbitt is poured by means of a ladle, or in any desired manner. The babbitt completely fills the space 29 to insure the complete lining of the bearing.

In order that the connecting rod may be held in exact position both upon the babbitting jig and the boring machine, I provide a construction as illustrated in Fig. 11, in which a pin 75 is substituted for the pin 23 and has thereon a fixed bottom cone 76 and a slidable cone 77 arranged in opposed relationship, these cones being adapted to be forced towards each other by means of nuts 78 and 79 fitting upon opposite ends of the pin 75. This arrangement I find highly desirable for the reason that the wrist pin apertures indicated by the reference character 81 vary widely in the different connecting rods and it is not, therefore, practical to carry a sufficient stock of the pins 23 to fit all sizes of apertures.

In Fig. 13, I have illustrated a device in which bearings besides those which are provided in connecting rods may be held for lining and boring. A bracket 82 is provided with a large aperture 83, the walls 84 and 85 of which form a V for the reception of the bearing 86, which is clamped against said walls by means of a V-shaped head 87 carried upon a screw 88 which extends through the end of the bracket and is braced by means of an arm 89, a lever 91 being employed for operation of this screw. With the bearing thus secured in the member 82, it is centered by the same method by which the connecting rod bearings are centered and the opposite end of the bracket is provided with an aperture 92, corresponding to the wrist pin aperture in the connecting rod and adapted to be held in desired position by the same mechanism.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. Apparatus for relining the bearings of automobile connecting rods and the like, comprising a jig having a core member extending upwardly from the base thereof and adapted to pass through the bearing to be lined, a conical member adapted to fit movably upon said core member to accurately center the bearing aperture thereabout and means for securing the rod in the jig with the bearing in centered position to obtain a uniform thickness of lining material poured into the space between said member and said bearing.

2. Apparatus for relining the bearings of automobile connecting rods and the like, comprising a horizontal support, a core member projecting from said support and adapted to pass through the bearing aperture, a conical member adapted to fit movably upon said core member to accurately center the bearing aperture thereabout and means for holding it in centered position during pouring of lining material into the uniform space thus provided between said member and bearing.

3. Apparatus for relining the bearings of automobile connecting rods and the like, comprising a horizontal support, a core member projecting from said support and adapted to pass through the bearing aperture, a conical member adapted to fit movably upon said core member to accurately center the bearing aperture thereabout and means for holding it in centered position during pouring of lining material into the space between said member and bearing, said holding means being adjustable.

4. Apparatus for relining the bearings of automobile connecting rods and the like, comprising a horizontal supporting base, a core member fixed upon said base, a conical member adapted to fit movably upon said core member to accurately center the bearing aperture thereabout and means for rigidly holding said rod in centered position during pouring of lining material into the space between said member and said bearing.

5. Apparatus for relining the bearings of automobile connecting rods and the like, comprising a horizontal supporting base, a core member fixed upon said base, means for centering the bearing of the connecting rod or the like upon said core member, and means for rigidly holding said rod in centered position during pouring of lining material into the space between said member and said bearing, said centering means comprising a cone movable upon said core member and into the bearing aperture.

6. Apparatus for relining the bearings of automobile connecting rods and the like, comprising a horizontal supporting base, a core member fixed upon said base, means for centering the bearing of the connecting rod or the like upon said core member, and means for rigidly holding said rod in centered position during pouring of lining material into the space between said member and said bearing, said centering means comprising a flared member movable upon said core member and into the bearing aperture.

7. Apparatus for relining the bearings of automobile connecting rods and the like, comprising a horizontal supporting frame, means on said frame for holding a connecting rod or the like in fixed position and providing a core member extending through the bearing to be lined, and means insertable into the bearing aperture for centering the bearing about said member.

8. Apparatus for relining the bearings of automobile connecting rods and the like, comprising a horizontal supporting frame, means on said frame for holding a connecting rod or the like in fixed position and providing a core member extending through the bearing to be lined, means insertable into the bearing aperture for centering the bearing about said member, and means arrangeable upon said member for directing the flow of lining material poured into the space between said bearing and said member.

9. Apparatus for relining the bearings of automobile connecting rods and the like, comprising a horizontal supporting frame, a core member extending upwardly from said frame, a bearing support spaced from the base of the core member, means insertable into the bearing aperture for arranging the bearing in desired spaced relationship to the core member, and adjustable means for securing the rod upon said frame with the bearing in desired position for pouring.

10. Apparatus for relining the bearings of automobile connecting rods and the like, comprising a horizontal supporting frame, a core member extending upwardly from said frame, a bearing support spaced from the base of the core member, means insertable into the bearing aperture for arranging the bearing in desired spaced relationship to the core member, and adjustable means engaging the opposite end of the rod for securing said rod upon said frame with the bearing in desired position for pouring.

11. Apparatus for relining the bearings of automobile connecting rods and the like, comprising a horizontal supporting frame, a core member extending upwardly from said frame, a bearing support spaced from the base of the core member, means insertable into the bearing aperture for arranging the bearing in desired spaced relationship to the core member, adjustable means for securing the rod upon the frame with the bearing in desired position for pouring, and means arrangeable upon said core member after the rod is positioned to direct the flow of lining material and provide a restricted space above the bearing aperture.

12. Apparatus for relining automobile bearings and the like, comprising a holding bracket for the bearing, a horizontal supporting frame, a core member projecting from said frame and adapted to extend through said bearing, means insertable into the bearing aperture for centering the bearing about said core member to provide a uniform space into which lining material may be poured, and adjustable means for securing said bracket in the position assumed when the bearing is centered.

13. Apparatus for operating upon the bearings of automobile connecting rods and the like, comprising a holding bracket for the bearing, a supporting frame, a member mounted in said frame and extending through said bearing, means for centering the bearing upon said member, and adjustable means for securing said bracket in the position assumed when the bearing is centered.

WILLIAM STANLEY GREEN.